(12) United States Patent
Fisher

(10) Patent No.: US 10,414,072 B2
(45) Date of Patent: Sep. 17, 2019

(54) DRILL SPRING DEVICE METHOD OF USE

(71) Applicant: THE BOEING COMPANY, Chicago, IL (US)

(72) Inventor: Michael Fisher, Charleston, SC (US)

(73) Assignee: THE BOEING COMPANY, Chicago, IL (US)

( * ) Notice: Subject to any disclaimer, the term of this patent is extended or adjusted under 35 U.S.C. 154(b) by 382 days.

(21) Appl. No.: 15/214,951

(22) Filed: Jul. 20, 2016

(65) Prior Publication Data
US 2018/0021986 A1 Jan. 25, 2018

(51) Int. Cl.
*B29C 33/74* (2006.01)
*B29K 105/24* (2006.01)

(52) U.S. Cl.
CPC ........ *B29C 33/74* (2013.01); *B29K 2105/246* (2013.01)

(58) Field of Classification Search
CPC .. Y10T 408/561; B23B 41/00; B23B 2247/00
USPC .......................................................... 408/87
See application file for complete search history.

(56) References Cited

U.S. PATENT DOCUMENTS

| | | | | |
|---|---|---|---|---|
| 3,781,124 A | * | 12/1973 | Bodycomb | B23B 35/005 408/61 |
| 4,578,004 A | * | 3/1986 | Reil | B26D 3/085 408/101 |
| 5,519,934 A | * | 5/1996 | Dobrikow | B21D 39/031 29/521 |
| 5,957,024 A | * | 9/1999 | Kuwabara | B26F 1/02 83/685 |

FOREIGN PATENT DOCUMENTS

DE          4111102 A1 * 10/1992  ........... B21D 39/031

* cited by examiner

*Primary Examiner* — Jeffry H Aftergut
*Assistant Examiner* — Jaeyun Lee
(74) *Attorney, Agent, or Firm* — Marshall, Gerstein & Borun LLP

(57) ABSTRACT

An apparatus for restoring a tool for fabricating a part from a composite laminate material including a contact member which includes a contact surface, wherein the contact member is adapted to be positioned within a bore of a wall of the tool such that at least a portion of the contact surface of the contact member aligns with a surface of the wall. The apparatus further includes a resilient member positioned with respect to the contact member such that an opposing side to the contact surface of the contact member, is positioned between the contact surface and the resilient member. A method is included for restoring a tool for fabricating a part from a composite laminate material.

18 Claims, 5 Drawing Sheets

DRILL SPRING DEVICE METHOD OF USE

FIELD

The invention relates to a tool for making composite parts and more particularly to closing an opening drilled into a wall of the tool.

BACKGROUND

Steps are taken in the preparation of tools used in fabricating parts constructed of composite laminate material. In the process of finishing a part, often a hole is needed to be drilled through the cured part. The drilling of a hole occurs with the cured composite laminate material positioned in the tool in which it was cured. Maintaining the cured composite laminate material in the tool provides stability to the cured composite laminate material which provides improved quality control of the drilling process.

In the process of drilling a hole through the cured composite laminate material, the drill bit will pass through the cured material assuring a complete fully dimensioned hole is positioned through the cured composite laminate material. With the drill bit passing through the cured composite laminate material the drill bit engages a wall of the tool positioned immediately beyond the drilled hole in the cured composite laminate material. As a result of this drilling process a hole is created in the wall of the tool, a tool which is needed to be reused in fabricating another part.

Thus, in preparation of the tool for fabricating another part the hole in the wall of the tool needs to be closed by the fabricator to prevent resin from entering the hole with positioning composite laminate material onto the wall of the tool in reusing the tool. Without closing the hole, resin from the composite laminate material will leak into the hole and create, in reuse of the tool, an unwanted resin nub configuration positioned on the cured part. Should a resin nub result in being positioned on the cured part, the fabricator will need to hand sand the part to remove the resin nub. This process is time consuming and can create potential assembly issues when using the fabricated part such as in the use of the fabricated part in tight tolerances or with creating uneven surfaces on the part resulting in shimming operations needing to be applied.

Fabricators attempt to reduce the occurrences of resin nubs appearing on the cured part with filling the holes which were drilled into the wall of the tool in a previous fabrication of a part with the tool. The fabricator will attempt to fill these holes with the use of a potting compound with applying the compound into the hole to close the hole. Several applications of the potting compound material may be needed with the material drying, shrinking and creating voids at the hole location. In addition, with the tool in re-use containing the composite laminate material, the tool with composite material is placed into an autoclave and the potting compound material used to fill the hole in the wall of the tool can further shrink. As a result, the potting compound can even fall out of engagement with the wall of the tool resulting in resin nubs being positioned on the part at the hole location.

As a result, timely efforts are made by fabricators to close previously drilled holes in walls of tooling in the preparation of that tooling for fabrication of another part. These timely repair efforts may not reliably maintain closure of the hole further requiring hand sanding of the fabricated part at the hole location. This sanding process further presents complications when employing the sanded fabricated part in fabricating an assembly.

SUMMARY

An example of an apparatus for restoring a tool for fabricating a part from a composite laminate material including a contact member which includes a contact surface, wherein the contact member is adapted to be positioned within a bore of a wall of the tool such that at least a portion of the contact surface of the contact member aligns with a surface of the wall. The apparatus further includes a resilient member positioned with respect to the contact member such that an opposing side to the contact surface of the contact member is positioned between the contact surface and the resilient member.

An example of a method for restoring a tool for fabricating a part from composite laminate material includes the step of drilling a hole with a drill bit through cured composite laminate material positioned overlying a surface of a wall of the tool and a contact surface of a contact member such that the drill bit contacts the contact surface of the contact member. The contact member is positioned and moveable within a bore defined by a wall of the tool with at least a portion of the contact surface of the contact member aligned with the surface of the wall. The method further includes a step of moving the contact member with the drill bit such that the at least a portion of the contact surface moves in a first direction within the bore and moves out of alignment with the surface of the wall.

The features, functions, and advantages that have been discussed can be achieved independently in various embodiments or may be combined in yet other embodiments further details of which can be seen with reference to the following description and drawings.

DESCRIPTION

It is understood there is a need to efficiently and reliably restore a tool used in fabricating a part from composite laminate material wherein the tool has had a hole drilled into a wall of the tool from a drill bit which has drilled a hole through the cured part positioned in the tool. The hole which has been drilled into the wall of the tool needs to be closed for reuse of the tool so as to avoid resin leaking from the composite laminate material into the hole and curing during the curing process of the composite laminate material creating unwanted resin nubs on the part. The fabricator uses potting compounds to close these holes in the tool which is time consuming, costly and an unreliable process.

In using potting compound, the potting compound must be kept available and multiple applications may be required of the compound in an attempt to close a particular hole. Moreover, maintaining the closure of the hole may be difficult where the potting compound fails to stay within the confines of the hole during autoclaving of the part. This failure to maintain the hole in a closed position will result in the undesired leak of resin creating a resin nub on the part from the curing process. As mentioned earlier, the removal of the resin nub requires additional labor and the application of the part subsequently to the removal of the nub can add complications and additional cost to fabricating an assembly with such a part.

The present apparatus and method for restoring a tool, as will be described herein, will permit the fabricator to avoid the time and cost and unreliability of the past methods for attempting to close and maintain closure of a hole in a tool which was created by drilling a hole through a previously cured part positioned in the tool. The present apparatus and method will avoid the costs of needing potting compound as well as the labor needed to fill those holes with the potting compound. Moreover, there will no longer be uncertainty presented by potting compound failing to maintain a hole in a closed position during the curing process such that resin leaks into the hole requiring the part to be sanded to remove the resin nubs from the part. In addition, the present apparatus and method will remove complications presented by sanding of the part to remove the resin nubs.

Figure 1:
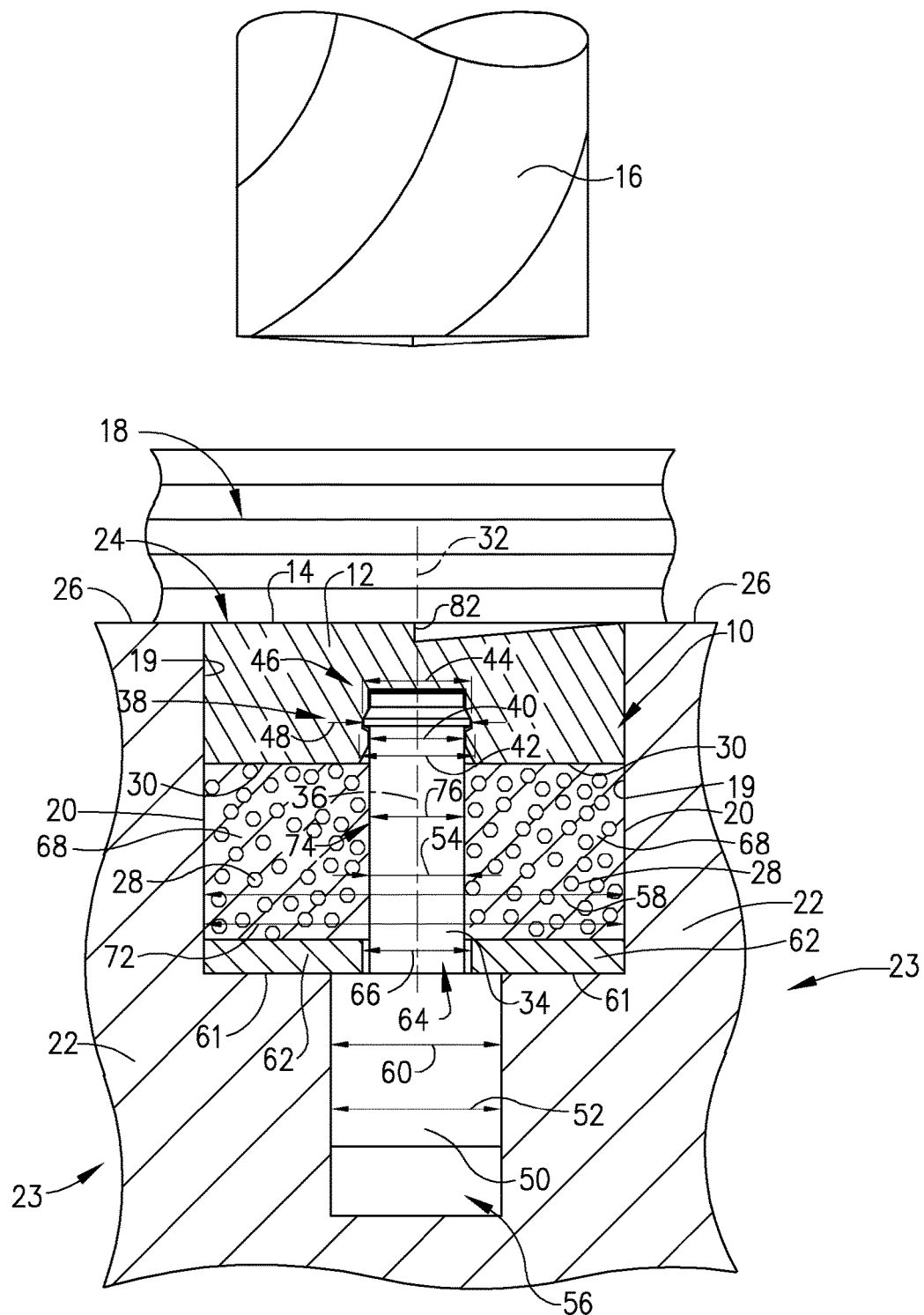
FIG. 1 is a cross section view of a drill bit positioned above cured composite laminate material positioned overlying a wall of a tool and the apparatus for restoring the tool.

In referring to FIG. 1, apparatus 10 for restoring a tool for fabricating a part from a composite laminate material is shown. Apparatus 10 includes contact member 12 which has contact surface 14. Contact surface 14, as will be discussed in more detail herein, will come into contact with drill bit 16, as seen in FIG. 2, with drill bit 16 having drilled hole 17 through cured composite laminate material 18.

Contact member 12 is sized and shaped to have a close fit with interior walls 19 of bore 20 and yet be able to slide within bore 20. Bore 20 is defined by wall 22 of tool 23 and both bore 20 and contact member 12 are cylindrically shaped in this example. The close fit between contact member 12 and bore 20 inhibits flow of resin from uncured composite laminate material 18 into bore 20 when uncured composite laminate material 18 is positioned to overlie wall 22 and contact member 12.

At least a portion of contact surface 24, as seen in FIG. 1, aligns with surface 26 of wall 22 of tool 23. The position of at least a portion of contact surface 24 being aligned with surface 26 of wall 22 provides a consistent planar surface upon which composite laminate material 18 is positioned to overlie contact member 12 and surface 26 of wall 22 of tool 23 in an uncured state and this configuration remains consistent through the curing process. A resilient member 28 is positioned with respect to contact member 12 within bore 20 such that opposing side 30 of contact member 12 is positioned between contact surface 14 and resilient member 28. As will be discussed in further detail herein, resilient member 28 can be constructed from a variety of materials and configurations. Resilient member 28, permits contact member 12 to move within bore 20 as seen in FIG. 2 with drill bit 16 exerting a force onto contact surface 14. Resilient member 28 moves contact member 12 to a restored position with drill bit 16 no longer exerting a force onto contact surface 14. Contact member 12, as a result, moves in bore 20 back to a position such that at least a portion of contact surface 24 is placed in alignment with surface 26 of wall 22.

Figure 2:
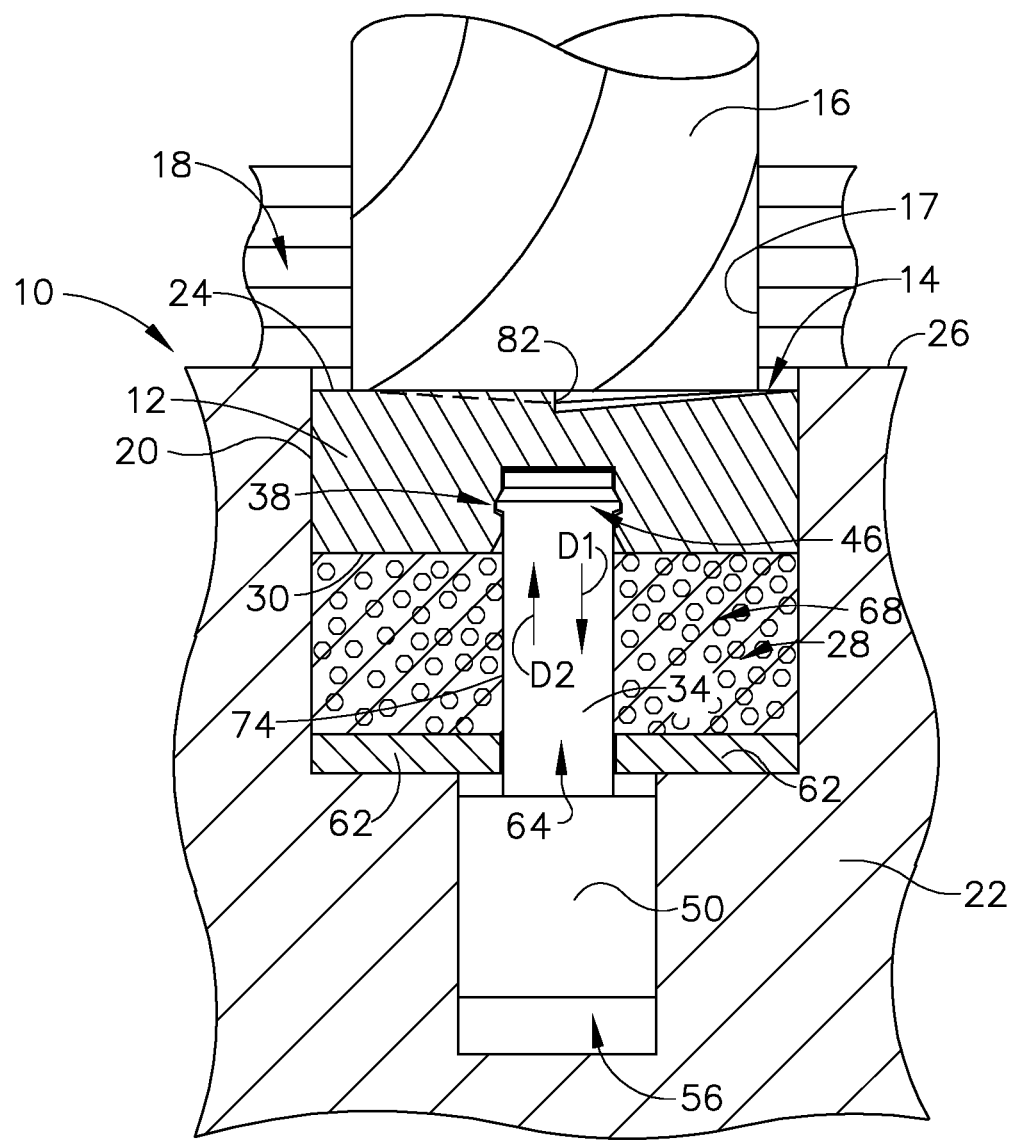
FIG. 2 is the cross section view of FIG. 1 with the drill bit having drilled a hole through the cured composite laminate material and in contact with the apparatus for restoring the tool.

In this example, contact member 12 has a central axis 32 about which contact member 12 turns with coming into contact with turning drill bit 16 as drill bit 16 passes through composite laminate material 18, as seen in FIG. 2. Further in this example, first shaft member 34, as seen in FIG. 1, is connected to contact member 12, as will be discussed in more detail below. First shaft member 34 in this example is configured in a cylindrical shape and has a central axis 36 positioned in alignment with central axis 32 of contact member 12. As seen in FIG. 1, first shaft member 34 extends within bore 20 in a direction away from contact member 12. First shaft member 34 extends through resilient member 28 and in this example, is positioned so as to be able to move freely within bore 20 with drill bit 16 exerting a force onto contact member 12 as seen in FIG. 2 and likewise with drill bit 16 removed from exerting a force onto contact member 12.

As will be discussed herein, contact member 12 and first shaft member 34 are rotatably connected together such that with contact member 12 coming into contact with turning drill bit 16, drill bit 16 imparts rotation to contact member 12 without imparting the same rotation to first shaft member 34. In this example, contact member 12 defines second bore 38, which as shown in FIG. 1, extends from opposing side 30 of contact member 12 and extends in a direction toward contact surface 14. Second bore 38 defines a configuration in this example, as described below, so as to receive first shaft member 34 such that contact member 12 and first shaft member 34 can independently rotate relative to one another.

As seen in FIG. 1, second bore 38 defines a diameter 40 positioned within second bore 38 which has a dimension which is less than a dimension of second diameter 42 also defined by second bore 38. Second diameter 42 is positioned spaced apart from diameter 40 in a direction toward opposing side 30 of contact member 12. The dimension of diameter 40 is also less than third diameter 44 also defined by second bore 40 wherein third diameter 44 is positioned spaced apart from diameter 40 in a direction toward contact surface 14. In this example, diameter 40 provides a position of narrowing within second bore 38 centrally positioned within second bore 38.

With second bore 38 configuration, end portion 46 of first shaft member 34 defines a fourth diameter 48 wherein fourth diameter 48 has a dimension which is less than the dimension of second diameter 42 of second bore 40 of contact member 12. The dimension of fourth diameter 48 is greater than the dimension of diameter 40 defined by second bore 40 of contact member 12. This configuration permits inserting end portion 46 of first shaft member 34 into second bore 38 and providing fourth diameter 48 of end portion 46 to be forced by diameter 40 of contact member 12 creating a snap fit arrangement between contact member 12 and first shaft member 34. With fourth diameter 48 positioned beyond diameter 40, diameter 40 inhibits first shaft member 34 from being axially removed from second bore 38 of contact member 12 and fourth diameter 48 is positioned within second bore 38 wherein third diameter 44 is larger in dimension than the dimension of fourth diameter 48. In addition, sixth diameter 54 of first shaft member 34 which is positioned along first shaft member 34 which extends along first shaft member 34 in a direction away from fourth diameter 48 of first shaft member 34, having a dimension less than that of the dimension of diameter 40 of contact member and any diameter of second bore 38 positioned between diameter 40 within second bore 38 extending in a direction toward opposing side 30 of contact member 12 which defines a distal end of second bore 38. This configuration permits end portion 46 of first shaft member 34 to enter second bore 38 and snap fit beyond diameter 40 of second bore 38 so as to inhibit axial removal of first shaft member from second bore 38 and permits first shaft member 34 and contact member 12 to rotate relative to one another.

In this example, second shaft member 50 is connected to first shaft member 34. Contact member 12 and second shaft member 50 are spaced apart such that first shaft member 34 is positioned between contact member 12 and second shaft member 50. Second shaft member 50 defines a fifth diameter 52 having a dimension greater than the dimension of sixth diameter 54 of first shaft member 34. Sixth diameter 54 extends along first shaft member 34 between contact member 12 and second shaft member 50. Sixth diameter 54, in this example, also extends from fourth diameter 48 positioned on end portion 46 of first shaft member 34 positioned within second bore 38 of contact member 12 to at least the opposing side 30 at distal end of second bore 38.

In this example, first shaft member 34 and second shaft member 50, are constructed to form a single piece construction. The construction of first and second shaft members 34, 50 can be selected from a wide of materials which have a low coefficient of expansion such as tungsten carbide, invar nickel alloys, carbon, or graphite. Second shaft member 50 is adapted having a size and shape to slide within third bore 56. In this example, third bore 56 is defined by wall 22 and has a cylindrical configuration and second shaft member 50 likewise has a cylindrical configuration. Second shaft member 50 has fifth diameter 52 which has a dimension smaller than a dimension of eighth diameter 60 of third bore 56. Third bore 56 is in communication with and positioned in alignment with bore 20, as seen in FIG. 1, and bore 20 defines seventh diameter 58 which has a greater dimension than a dimension of eighth diameter 60 of third bore 56.

With bore 20 having seventh diameter 58 with the dimension greater than the dimension of eighth diameter 60 of third bore 56 an annular surface 61 is defined by wall 22 positioned at a bottom of bore 20. In this embodiment, barrier member 62 has an annular configuration defining opening 64 which defines ninth diameter 66. Barrier member 62 is affixed to annular surface 61 positioned at the bottom of bore 20. Barrier member 62 is positioned between contact member 12 and second shaft member 50. Ninth diameter 66 has a dimension greater than the dimension of sixth diameter 54 of first shaft member 34 permitting first shaft member 34 to be able to move through opening 64. In contrast the dimension of ninth diameter 66 of opening 64 is less than the dimension of fifth diameter 52 of second shaft member 50. With barrier member 62 affixed to annular surface 61 at the bottom of bore 20, second shaft member 50 cannot pass through opening 64 of barrier member 62.

With resilient member 28 positioned within bore 20 between contact member 12 and barrier member 62, resilient member 28 is positioned so as to exert a force on contact member 12 in a direction toward surface 26 of wall 22. The movement or travel of contact member 12 within bore 20 in the direction toward surface 26 of wall 22 is limited by barrier member 62 blocking second shaft member 50 and maintaining at least a portion of contact surface 24 aligned with surface 26 of wall 22.

Figure 3:
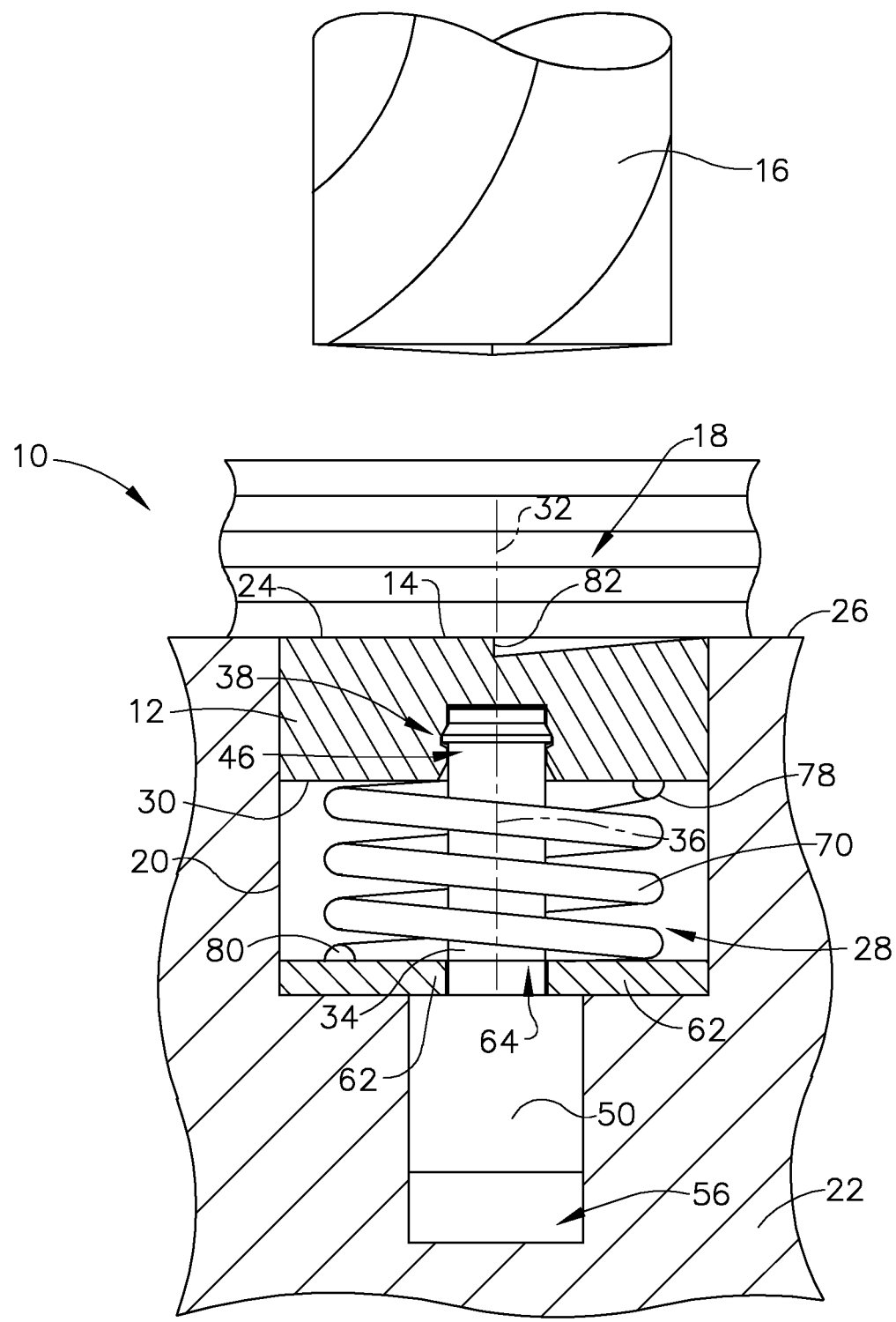
FIG. 3 is a second embodiment of the apparatus for restoring the tool as seen in FIG. 1.

Resilient member 28 can be constructed in one of a number of configurations and materials. In one example, resilient member 28 includes closed cell cross-linked ethylene copolymer foam 68 such as Evazote Foam as shown in FIGS. 1 and 2. Other configurations can include spring 70, as shown in FIG. 3. Forces imparted by drill bit 16 onto contact member 12 can include loads of up to four hundred pounds (400 lbs.). Resilient member 28 will encounter such a load exerted by drill bit 16, such as seen in FIG. 2, and once drill bit 16 is removed from being in contact with contact member 12, resilient member 28 will resiliently move back to its position prior to the force being exerted on resilient member 28 by drill bit 16 and thereby move contact member 12 to a restored position as seen in FIGS. 1 and 3 with at least a portion of contact surface 24 aligned with surface 26 of wall 22 of tool 23.

In the embodiment of resilient member 28 shown in FIG. 1, resilient member 28 has a cylindrical configuration having a tenth diameter 72 which has a dimension smaller than the dimension of seventh diameter 58 of bore 20 and defines, in this example, a central bore 74 having an eleventh diameter 76 having a dimension greater than sixth diameter 54 of first shaft member 34. This configuration and sizing of resilient member 28, in this example, will permit resilient member 28 to be compressed within bore 20 with the force exerted by drill bit 16 onto contact member 12. Additionally this will permit resilient member 28 to resiliently restore its position within second bore 16 with the removal of the force exerted by drill bit 16 onto contact member 12 without interference imposed onto resilient member 28 with respect to first shaft member 34 and interior walls 19 of bore 20.

In another embodiment of resilient member 28 shown in FIG. 3, resilient member 28 is a spring 70 constructed of stainless steel positioned between contact member 12 and barrier member 62. End 78 of spring 70 is positioned within a notch (not shown) of contact member 12 and opposing end 80 of spring 70 is positioned within a notch (not shown) of barrier member 62. The positioning of end 78 and opposing end 80 into notches of contact member 12 and barrier member 62 respectively provides resistance to spinning spring 70 within bore 20 with turning drill bit 16 in contact with contact member 12.

Figure 4:
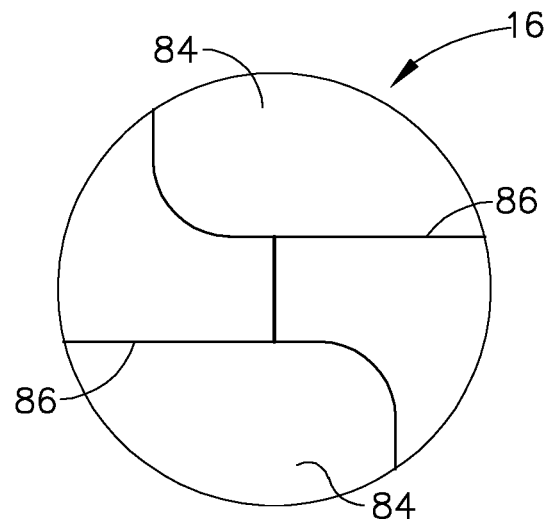
FIG. 4 is a bottom plan view of the drill bit as shown in FIG. 1.
Figure 5:
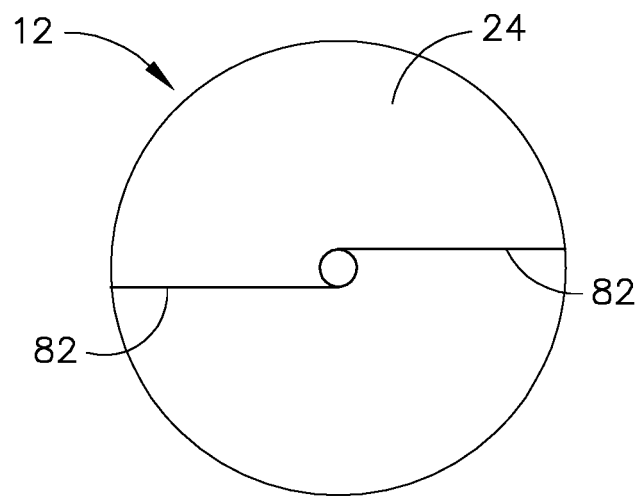
FIG. 5 is a plan view of a contact surface of the apparatus for restoring the tool as seen in FIG. 1.

Contact surface 14 of contact member 12 contacts drill bit 16 as seen in FIG. 2 once drill bit 16 has drilled through cured composite laminate material 18. Contact member 12 defines wall 82 which extends in a direction transverse to at least a portion of contact surface 24 as seen in FIGS. 1-3. Wall 82 is engaged or abutted by flute 84 which extends from cutting edge 86 of drill bit 16, as seen in FIGS. 2, 4 and 5. Drill bit 16 imparts a turning rotation to contact member 12. With drill bit 16 having fully penetrated through cured composite laminate material 18, hole 17 to be drilled in composite laminate material 18 is completed. This engagement with contact member 12 avoids a hole being drilled into wall 26 of tool 23 by drill bit 16. This further removes the need to repair a hole in wall 22 and prevents the occurrence of resin nubs from being formed on the part being fabricated.

Figure 6:
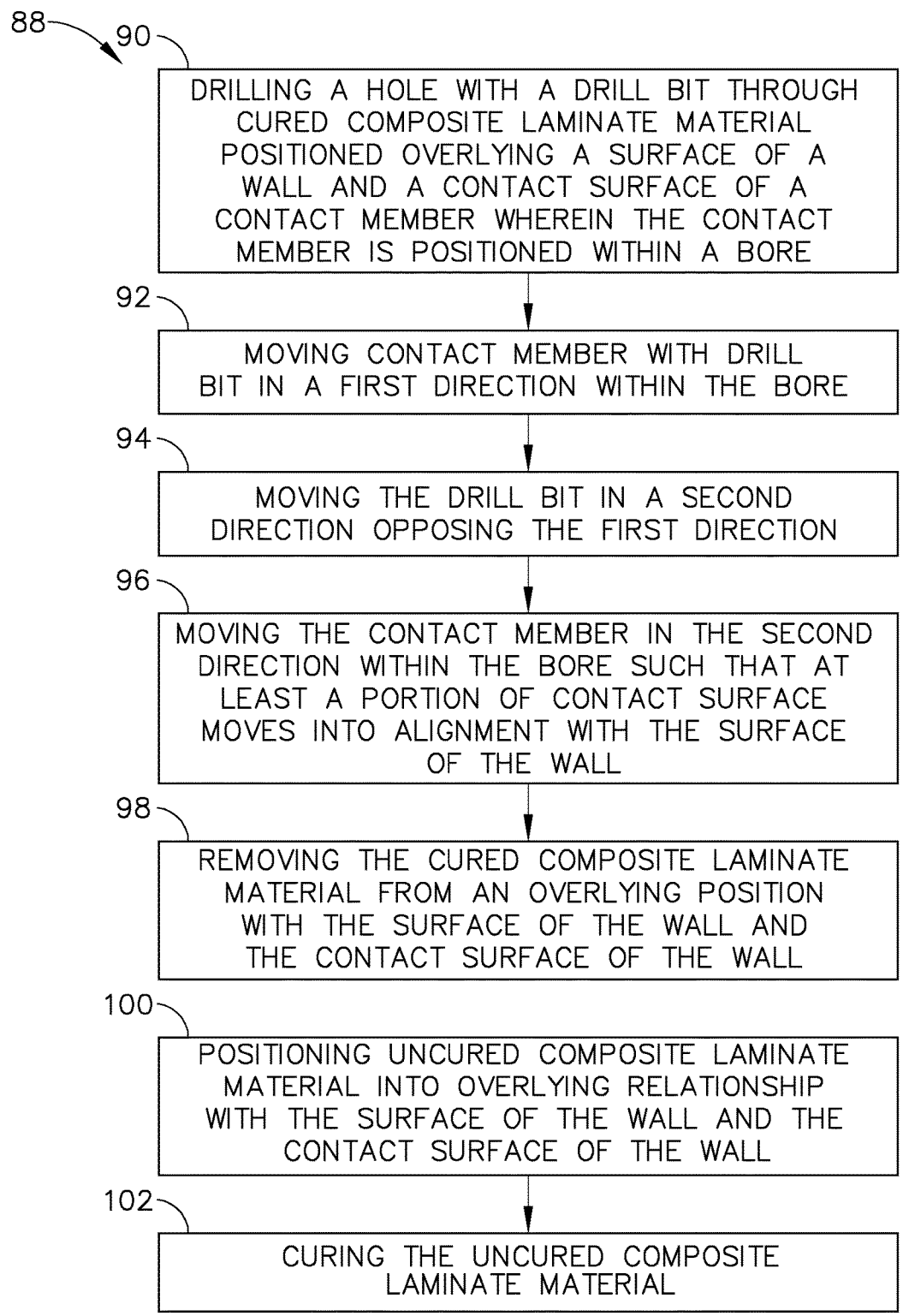
FIG. 6 is a flow chart for the method for a restoring a tool for fabricating a part from composite laminate material.

As shown in FIG. 6, method 88 is shown which sets forth a method for restoring a tool 23 for fabricating a part from composite laminate material. As discussed earlier, often holes have to be drilled through a cured composite laminate part which resides in tool 23 and overlies wall 22 within tool 23. The drill bit penetrates the cured composite laminate material and drills a hole into wall 22 which is thereafter required to be repaired before tool 23 can be reused. Method 88 restores wall 22 of tool 23 for reuse without the time consuming application of potting material and experiencing the unreliability of the potting material to maintain the repaired hole closed going through a curing process.

Method 88 includes the step 90 of drilling a hole 17 with a drill bit 16 through cured composite laminate material 18, as seen in FIGS. 1 and 2, wherein the composite laminate material 18 overlies surface 26 of wall 22 of tool 23. With drill bit 16 fully penetrating through composite laminate material 18, drill bit 16 contacts contact surface 14 of contact member 12. Contact member 12 is positioned within and is moveable within bore 20 which as described earlier, bore 20 is defined by wall 22 of tool 23 with at least a portion of contact surface 24 of contact member 12 aligned with surface 26 of wall 22. Method 88 further includes step 92 of moving contact member 12 with drill bit 16 such that contact member 12 along with the at least a portion of the contact surface 24 moves in a first direction D1, as shown in FIG. 2, within bore 20. The at least a portion of contact surface 24 moves out of alignment with surface 26 of wall 22 as seen in FIG. 2.

Method 88 further includes step 94 of moving drill bit 16 in a second direction D2, as shown in FIG. 2, which opposes direction D1. At this stage of method 88, hole 17 has been drilled through cured composite laminate material 18 and drill bit 16 is removed from composite laminate material 18. With moving drill bit 16 in second direction D2, step 96 includes contact member 12 moving in the second direction D2 within bore 20. As described earlier resilient member 28 moves contact member 12 such that the at least a portion of the contact surface 24 moves into alignment with surface 26 of wall 22. Travel of contact member 12 is limited within bore 20 with second shaft member 50 reaching and abutting against barrier member 62, as seen in such position in FIG. 1.

Method 88 further includes step 98 removing cured composite laminate material, which has had hole 17 drilled by drill bit 16, as seen in FIG. 2, from an overlying position with respect to surface 26 of wall 22 and the at least a portion of the contact surface 24 of contact member 12. Once the cured drilled composite laminate material 18 has been removed, tool 23 is in condition to be reused for fabricating another part. Method 88 further includes step 100 of positioning uncured composite laminate material (not shown), however would be positioned as seen for cured composite laminate 18 in FIG. 1. Composite laminate material 18 is in overlying relationship with surface 26 of wall 22 and the at least a portion of contact surface 24 of contact member 12. With uncured composite laminate material positioned in step 100, step 102 further includes curing the uncured composite material.

While various embodiments have been described above, this disclosure is not intended to be limited thereto. Variations can be made to the disclosed embodiments that are still within the scope of the appended claims.

What is claimed:

1. An apparatus for restoring a tool for fabricating a part from a composite laminate material, comprising:
   a contact member comprising a contact surface, which defines a wall which extends away from at least a portion of the contact surface, wherein the contact member is adapted to be positioned within a bore of a wall of the tool such that at least a portion of the contact surface of the contact member aligns with a surface of the wall of the tool;
   a resilient member is positioned with respect to the contact member such that an opposing side to the contact surface of the contact member is positioned between the contact surface and the resilient member; and
   a first shaft member rotatably connected to the contact member such that the contact member and the first shaft member independently rotate relative to one another.

2. The apparatus of claim 1, wherein the contact member comprises a cylindrical shape with a central axis.

3. The apparatus of claim 2, wherein:
   the first shaft member is adapted to extend within the bore in a direction away from the contact member; and
   the first shaft member comprises a cylindrical shape with a second central axis positioned aligned with the central axis of the contact member.

4. The apparatus of claim 1, wherein the contact member defines a second bore which extends from the opposing side of the contact member and the second bore extends in a direction toward the contact surface.

5. The apparatus of claim 4, wherein the second bore of the contact member defines a diameter having a dimension, wherein:
   the dimension is less than a dimension of a second diameter defined by the second bore, wherein the second diameter is positioned spaced apart from the diameter in a direction toward the opposing side of the contact member; and
   the dimension is less than a dimension of a third diameter defined by the second bore, wherein the third diameter is positioned spaced apart from the diameter in a direction toward the contact surface.

6. The apparatus of claim 5, wherein an end portion of the shaft member defines a fourth diameter wherein:
   the fourth diameter has a dimension which is less than the dimension of the second diameter of the second bore of the contact member; and
   the dimension of the fourth diameter is greater than the dimension of the diameter of the second bore of the contact member.

7. An apparatus for restoring a tool for fabricating a part from a composite laminate material, comprising:
   a contact member comprising a contact surface, wherein:
      the contact member defines a wall which extends away from at least a portion of the contact surface; and
      the contact member is adapted to be positioned within a bore of a wall of the tool such that at least a portion of the contact surface of the contact member aligns with a surface of the wall of the tool; and
   a resilient member is positioned with respect to the contact member such that an opposing side to the contact surface of the contact member is positioned between the contact surface and the resilient member; wherein:
      the contact member and a second shaft member are spaced apart such that at least a portion of a first shaft member is positioned between the contact member and the second shaft member;
      the second shaft member comprises a fifth diameter having a dimension greater than a dimension of a sixth diameter defined by the first shaft member positioned along the first shaft member between the contact member and the second shaft member;
      the second shaft member is adapted to slide within a third bore defined by the wall of the tool wherein the third bore is in communication with and positioned in alignment with the bore; and
      a seventh diameter defined by the bore has a greater dimension than a dimension of an eighth diameter defined by the third bore.

8. The apparatus of claim 7, further includes a barrier member positioned between the contact member and the second shaft member, wherein:
   the barrier member defines an opening which defines a ninth diameter having a dimension greater than the dimension of the sixth diameter of the first shaft member; and the dimension of the ninth diameter of the opening is less than the dimension of the fifth diameter defined by the second shaft member.

9. The apparatus of claim 8, further includes the resilient member positioned between the contact member and the barrier member.

10. The apparatus of claim 9, wherein the resilient member comprises one of closed cell solid foam and a spring.

11. The apparatus of claim 1, wherein the contact member defines a wall member which extends in a direction transverse to the at least a portion of the contact surface.

12. The apparatus of claim 7, wherein the first shaft member and the second shaft member form a single piece construction.

13. A method for restoring a tool for fabricating a part from composite laminate material, comprising the steps of:
   drilling a hole with a drill bit through cured composite laminate material positioned overlying a surface of a wall of the tool and a contact surface of a contact member such that the drill bit contacts the contact surface of the contact member, wherein the contact member is positioned and moveable within a bore defined by the wall of the tool with at least a portion of the contact surface of the contact member aligned with the surface of the wall of the tool; and
   moving the contact member with the drill bit such that the at least a portion of the contact surface moves in a first direction within the bore and moves out of alignment with the surface of the wall of the tool, wherein:
   a resilient member is positioned with respect to the contact member such that an opposing side to the contact surface of the contact member is positioned between the contact surface and the resilient member; and
   a first shaft member is rotatably connected to the contact member such that the contact member and the first shaft member independently rotate relative to one another.

14. The method of claim 13, further including the step of moving the drill bit in a second direction opposing the first direction.

15. The method of claim 14, further including the step of moving the contact member in the second direction within the bore such that the at least a portion of the contact surface moves into alignment with the surface of the wall of the tool.

16. The method of claim 15, further including the step of removing the cured composite laminate material in which the hole has been drilled from an overlying position with the surface of the wall of the tool and the contact surface of the contact member.

17. The method of claim 16, further including the step of positioning an uncured composite laminate material into overlying relationship with the surface of the wall of the tool and the contact surface of the contact member.

18. The method of claim 17, further including the step of curing the uncured composite material.

* * * * *